United States Patent [19]

Bice et al.

[11] 3,995,559
[45] Dec. 7, 1976

[54] PROPELLANT GRAIN WITH ALTERNATING LAYERS OF ENCAPSULATED FUEL AND OXIDIZER

[75] Inventors: Harold C. Bice, Penns Grove, N.J.; Manville I. Bro, Wilmington, Del.; John R. Dalton, Broomall, Pa.

[73] Assignee: E. I. Du Pont de Nemours and Company, Wilmington, Del.

[22] Filed: June 21, 1962

[21] Appl. No.: 205,180

[52] U.S. Cl. .............................. 102/100; 102/103; 149/15; 149/19.3
[51] Int. Cl.² ................. C06B 45/06; C06B 45/12
[58] Field of Search ............ 102/98, 100–104; 60/35.6 RS, 35.6 RR, 253, 255; 149/19, 87, 37

[56] References Cited

UNITED STATES PATENTS

| | | | |
|---|---|---|---|
| 2,408,252 | 9/1946 | De Ganahl | 60/255 |
| 2,926,613 | 3/1960 | Fox | 102/100 |
| 2,970,898 | 2/1961 | Fox | 149/19 |
| 3,035,948 | 5/1962 | Fox | 149/87 |
| 3,054,353 | 9/1962 | Rumpp et al. | 102/100 |
| 3,056,701 | 10/1962 | Fritzen | 102/99 |
| 3,067,686 | 12/1962 | Coover | 102/101 |

*Primary Examiner*—Verlin R. Pendegrass

[57] ABSTRACT

A solid propellant grain is disclosed comprising a plurality of alternating layers of encapsulated particulate solid fuel and solid oxidizer encapsulated by a matrix comprising polytetrafluoroethylene and a polymeric adhesive with adjacent layers being bonded together at confronting surfaces by the polymeric adhesive.

6 Claims, 12 Drawing Figures

INVENTORS.
HAROLD C. BICE
MANVILLE I. BRO
JOHN R. DALTON
ATTORNEY

INVENTORS.
HAROLD C. BICE
MANVILLE I. BRO
JOHN R. DALTON
BY
ATTORNEY

PROPELLANT GRAIN WITH ALTERNATING LAYERS OF ENCAPSULATED FUEL AND OXIDIZER

The present invention relates to a solid propellant grain and more particularly to a solid propellant grain of such structure as to permit the safe incorporation therein of highly energetic, extremely sensitive combinations of metal fuels and oxidizers.

In solid propellant grains, finely divided propellant ingredients, e.g., solid oxidizers, metal fuels, ballistic modifiers, etc., conventionally are uniformly distributed in an elastomeric matrix or binder material. In the most desirable case, one selects a solid fuel and oxidizer which, on ignition, react together, under controlled stable burning conditions, for an efficient release of energy. However, the more energetic fuel-oxidizer systems often are chemically incompatible, the fuel and oxidizer reacting with each other under the conditions encountered during manufacture and storage of the grain. In some cases the systems are pyrophoric, i.e., mere contact of the fuel and oxidizer with each other is sufficient to initiate reaction. In other cases, the fuel and oxidizer may react as a result of temperature elevation, physical impact, shock, friction, static, contact with moisture, etc., any of which conditions may be encountered during formulation of the propellant mixture, and grain fabrication and storage. As an example, in one widely used method of preparation, the solid materials and a polymerization catalyst are mixed into a monomeric material, the resultant mixture is poured into a mold, and the mixture is cured at elevated temperatures to effect polymerization. In another widely used method of preparation, a polymeric binder is mixed with a liquid plasticizer to form a slurry, the finely divided solid materials are dispersed in the slurry, and the mixture is poured into a mold and cast by heating to a temperature at which the polymeric material is solvated by the plasticizer. In both of such procedures, the fuel and oxidizer are in contact with each other when subjected to mixing operations and temperature elevation. Therefore the ingredients employed are limited to those which do not react with each other at either ambient or elevated temperatures and are not affected by the atmospheric surroundings.

Thus, the existing state of the art places a severe limitation on the ingredients which may be incorporated in the grain by excluding the possibility of using various ingredients which would be closer to the ideal from the point of view of attainable energy. This limitation, serious in itself, is not made less significant by the fact that the nature of the low-energy elastomeric binders currently in use is such that the binder must occupy a relatively high proportion of the total volume of the grain to confer the necessary physical properties to the grain.

The instant invention provides a solid propellant grain comprising a plurality of layers of encapsulated particulate solid fuel and layers of encapsulated particulate solid oxidizer, said fuel and said oxidizer being encapsulated within their respective layers by a matrix comprising polytetrafluoroethylene and a polymeric adhesive, adjacent layers being bonded together at their confronting surfaces by a polymeric adhesive, and the layers in said grain being so disposed that a layer of oxidizer alternates with a layer of fuel. Because the fuel and oxidizer are encapsulated in different layers, the invention provides a means of achieving stability in a grain containing solid fuels and oxidizers which form highly energetic systems and are relatively unstable when in contact with each other.

The term "matrix" as used herein denotes that material which gives form to the particles of fuel or oxidizer enclosed or embedded therein. In the grain of this invention, the matrix is comprised of two components, i.e., polytetrafluoroethylene and a polymeric adhesive, both of which enclose or encapsulate the particles within the layers, the polymeric adhesive additionally acting to complete the encapsulation of particles on the surfaces of the layers which the adhesive bonds together. The unique nature of the matrix of the grain permits effective separate encapsulation of the particulate fuel and particulate oxidizer and at the same time confers structural integrity to the grain without the necessity of any pre-formed framework of structural supporting members such as cellular bodies, etc., to encase and support the particulate ingredients. Such a framework not only is undesirable from the standpoint of complexity and cost of fabrication, but also because it represents wasted space which could otherwise be taken up with more highly energetic materials.

An important component of the propellant grain of this invention is polytetrafluoroethylene resin in the encapsulating matrix. It is this resin which provides the essential binding power for the particles to be incorporated in the grain and at the same time can be worked into a sheet which is cohesive even in thicknesses as small as about ten mils. The binding power of polytetrafluoroethylene is good even when the volume of resin in the sheet formed is low, e.g., about five per cent. Thus, this resin offers two major advantages: (a) good binding power at low resin concentration affords more space for high-energy ingredients and (b) the ability to be formed into thin sheets permits separate encapsulation of high-energy fuels and oxidizers. In addition, this resin is highly inert and can be mixed with a wide variety of materials useful in propellant formulations without risk of chemical reaction therewith.

The second component of the encapsulating matrix is a polymeric adhesive, which provides additional encapsulation of the fuel and oxidizer particles in their respective layers and at the surfaces thereof, and also bonds the layers to each other at their confronting surfaces in the grain.

In the propellant grain of this invention, the layers of encapsulated fuel and encapsulated oxidizer are alternatingly arranged to produce any desired grain configuration in such a manner that a layer of fuel is bonded to a layer of oxidizer over as much of its surface area as possible, and vice-versa. This may be accomplished by combining the filled tetrafluoroethylene sheets or sections thereof, e.g., strips, disks, or wedges, in a variety of ways. A very common grain configuration is the tubular or perforated cylinder type. One of the most practical ways of fashioning a cylinder from sheets is to roll the sheets up to form convolute layers. Therefore, in the present solid propellant grain at least part of the grain may be formed by alternately rolling a fuel sheet and an oxidizer sheet in the same direction so as to form convolute layers of encapsulated fuel and convolute layers of encapsulated oxidizer. In addition to the fact that the propellant grain of this invention makes possible the safe use of high-energy fuel-oxidizer systems, a propellant grain having convolute layers in its design presents a significant advantage when the grain is to be produced in large sizes, e.g., of diameter greater than about 10 feet. In grains formed by casting, the size of mixing equipment, molds, heating surfaces, etc. needed is a distinct disadvantage; also, in casting large grains, it becomes increasingly difficult to achieve homogeneity throughout the grain. The present grain, however, can be formed easily in large sizes since the sheets can be rolled continuously in "carpet-roll" fashion without the need of expensive equipment. The homogeneity of the present grain is fixed by the respective positions of the sheets during rolling and thus remains constant from the interior to the exterior of the grain.

An alternative structure, which may be combined with a convolute structure, may comprise a plurality of essentially flat layers stacked one on the other in alternating sequence, the layers having a configuration to provide a grain as desired for final assembly. One such configuration is to have each layer as a disk with an axial aperture; another is to have each layer as a segment of a disk, so that a cylindrical structure is obtained by aligning segments.

To obtain the homogeneity necessary to assure stable burning in the grain, each oxidizer layer, over as much of its surface area as possible, is adjacent to a fuel layer and vice versa. Stable burning also requires that the fuel layers and oxidizer layers burn at essentially the same rate. The stoichiometric ratio of fuel to oxidizer is provided by proper fixing of such variables as thickness of the layers, density of the fuel and oxidizer in their respective encapsulating matrices, and surface area of fuel layer and oxidizer layer exposed to the flame.

In order to describe the invention more fully, reference is now made to the accompanying drawings, in which FIGS. 1, 2, and 3 are horizontal cross-sections of the grain of this invention wherein the layers are convolute and the central aperture is essentially circular;

Figure 1:
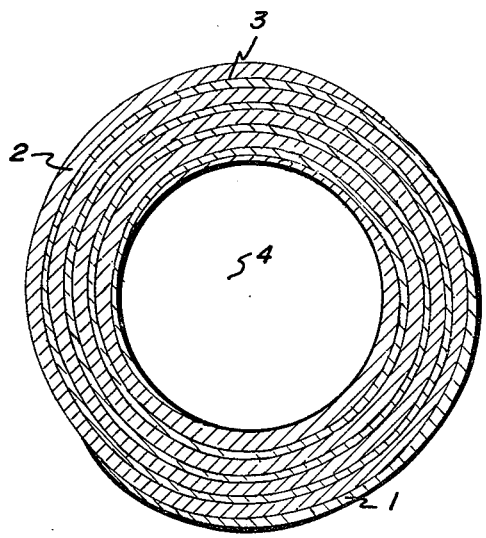

Referring now to the FIGS. in detail, in which like numbers are used to denote like elements, FIG. 1 shows a horizontal cross-sectional view of a grain which may be formed, for example, by wrapping a sheet of encapsulated fuel 1 and an adjacent sheet of encapsulated oxidizer 2 in the same direction about a cylindrical mandrel of circular cross-section and then removing the mandrel to leave an essentially circular central aperture 4. Each sheet makes the same number of revolutions about the mandrel so that the grain is composed of alternating fuel and oxidizer convolute layers, one-half of which are fuel layers and one-half of which are oxidizer layers. A ratio of oxidizer to fuel of 2 to 1 is provided by using fuel sheet 1 in a thickness which is one-half that of oxidizer sheet 2, maintaining the densities of sheet 1 and sheet 2 equal, and wrapping sheet 1 and sheet 2 in such a way that equal surface areas of each are exposed to the flame during burning. Accordingly, one sheet overlaps the other during rolling in such a way as to make one-half revolution alone before the other sheet begins to revolve. Adjacent layers are bonded together by polymeric adhesive 3 which, together with polytetrafluoroethylene, forms the matrix of sheets 1 and 2.

Figure 2:
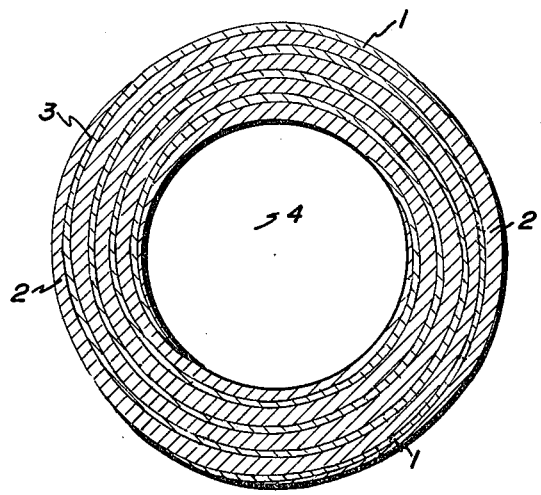

FIG. 2 shows a horizontal cross-sectional view of a grain which may be formed, for example, by wrapping two sheets of encapsulated fuel 1 alternatingly with two sheets of encapsulated oxidizer 2 about a mandrel like that described for FIG. 1, and removing the mandrel to leave aperture 4. Again, the grain is composed of alternating fuel and oxidizer convolute layers, one-half of which are fuel layers and one-half oxidizer layers. Adjacent layers are bonded together by polymeric adhesive 3. To expose equal surface areas, each sheet overlaps the next innermost sheet in such a way as to make one-fourth revolution alone before the next innermost sheet begins to revolve. Fuel sheet 1 is one-half as thick as oxidizer sheet 2.

Figure 3:
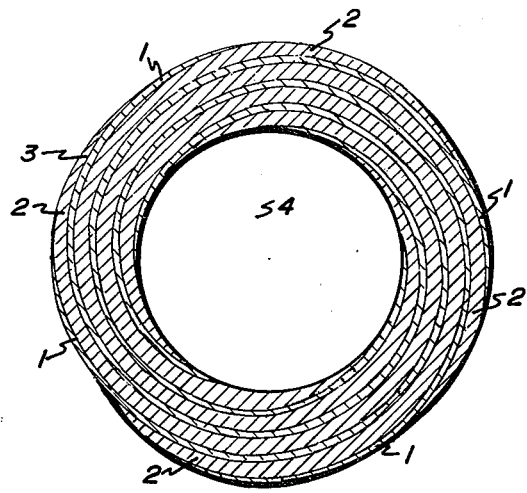

FIG. 3 shows a horizontal cross-sectional view of a grain which may be formed, for example, by wrapping four sheets of encapsulated fuel 1 alternatingly with four sheets of encapsulated oxidizer 2 as described for FIG. 1. In this case again, the grain is composed of alternating fuel and oxidizer convolute layers bonded together by adhesive 3. 4 represents a circular aperture. Each sheet overlaps the next innermost sheet in such a way as to make one-eighth revolution alone before the next innermost sheet begins to revolve.

Figure 4:
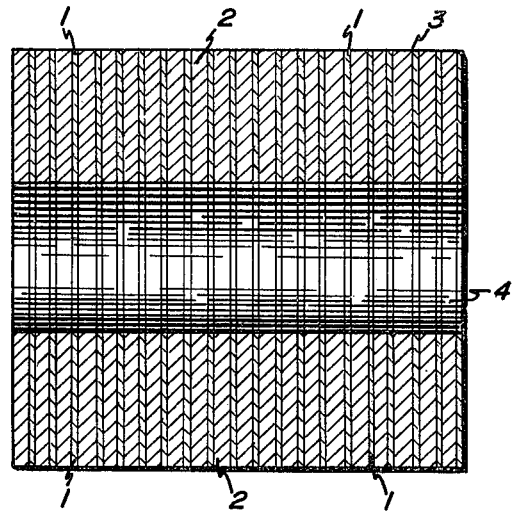
FIG. 4 is longitudinal cross-section of the grain of this invention wherein the layers are stacked disk-like layers and the central aperture is essentially circular.

FIG. 4 shows a longitudinal cross-section of a grain having a circular central aperture 4 extending through a series of alternatingly stacked layers of fuel 1 and oxidizer 2, the layers being stacked in a direction parallel to the longitudinal axis of the cylindrical grain. Adjacent layers are bonded together with adhesive 3.

Figure 5:
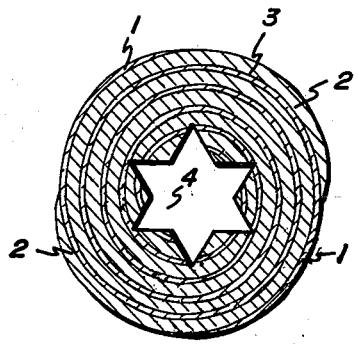
FIG. 5 is a horizontal cross-section of the novel grain wherein the layers are convolute and the central aperture is star-shaped.

FIG. 5 shows a horizontal cross-sectional view of a grain formed like that of FIG. 2, with the exception that the two sheets of encapsulated fuel 1 are wrapped alternatingly with two sheets of encapsulated oxidizer 2 around themselves or around a small circular mandrel, the mandrel is removed, and then the resulting cylinder is cut at the center so as to give a star shape to aperture 4. The star-shaped aperture can be designed to provide an internal burning area adapted to the desired period of time for total combustion of the grain and to give a substantially constant burning area during the combustion of the grain. In this design, all of the layers are convolute. 3 represents an adhesive.

Figure 6:
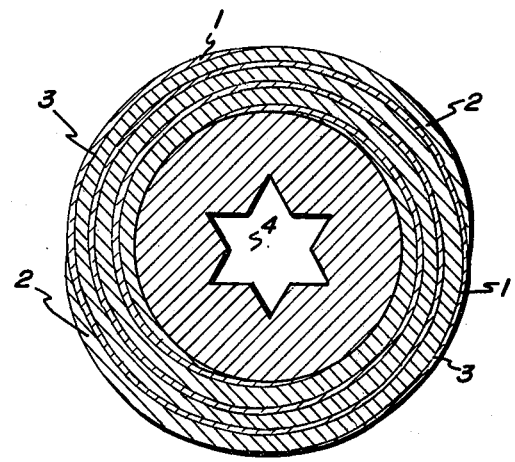
FIG. 6 is a horizontal cross-section of the grain wherein convolute layers surround a series of stacked disk-like layers and the central aperture is star-shaped.

FIG. 6 shows a horizontal cross-sectional view of a grain which also has a star-shaped central aperture 4. In this case, aperture 4 extends through a series of alternatingly stacked layers of fuel and oxidizer which are stacked in a direction parallel to the longitudinal axis of the cylindrical grain. The cross-sectioning has been made through a layer of fuel 1. The stacked layers are surrounded by alternating convolute layers of fuel 1 and oxidizer 2, and adjacent layers are bonded together with adhesive 3. Such a grain may be made, for example, by laminating together alternating circular disks cut from a sheet of encapsulated fuel 1 and a sheet of encapsulated oxidizer 2, respectively. A star-shaped aperture may then be applied to the laminate, e.g., by means of a star-shaped ream or die implement, and a number of such cut laminates may in turn be laminated together to form a cylinder of any desired length with a continuous central star-shaped aperture therethrough. Then sheets of fuel 1 and sheets of oxidizer 2 can be wrapped alternatingly around the cylinder in the manner shown in FIG. 2. In this grain, the fuel sheet 1 again is one-half as thick as oxidizer sheet 2.

Figure 7:
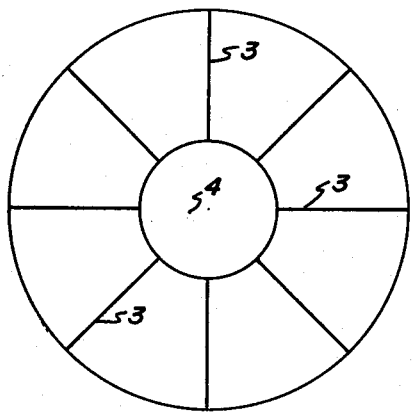
FIG. 7 is an end view of the grain wherein the layers are stacked layers of segmented disks.
Figure 8:
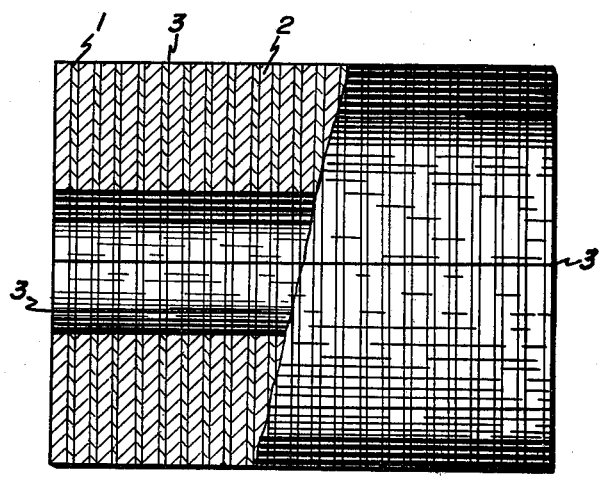
FIG. 8 is a longitudinal view in partial section of the grain depicted in FIG. 7.

The grain depicted in end view in FIG. 7 and in partial section in FIG. 8 has a circular central aperture 4 extending through it and is constructed of eight contiguous laminated truncated wedges circumferentially arranged with their inner ends defining the circular aperture 4. Contiguous surfaces of the wedges are bonded together with adhesive 3. As is shown in FIG. 8, the truncated wedge is a laminated structure consisting of stacked alternating layers of fuel 1 and oxidizer 2 bonded together by adhesive 3. Such a grain may be made, for example, by constructing the laminated truncated wedge either in its entire desired length or in partial lengths bonded together to give the desired length, and then arranging the desired number of wedges circumferentially and bonding together the contiguous surfaces of the wedges by adhesive.

Figure 9:
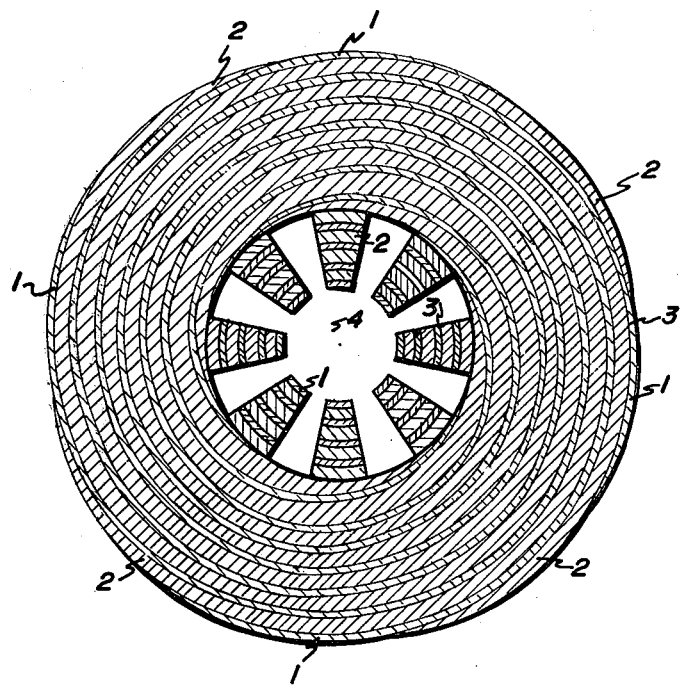
FIG. 9 is a horizontal cross-section of the grain wherein convolute layers surround an aperture which resembles a cogwheel, the spaces between cogs being filled with layers which are essentially parallel to the convolute layers.

In the grain depicted in horizontal cross-section in FIG. 9, central aperture 4 resembles a cogwheel having eight cogs, the eight spaces between cogs being filled with alternating layers of fuel 1 and oxidizer 2, and the aperture being surrounded by eight alternating convoluted layers of encapsulated fuel 1 and encapsulated oxidizer 2. The grain shown in FIG. 9 may be made, for example, by filling the spaces between cogs in a cogwheel-shaped mandrel with pre-formed laminates of alternating fuel and oxidizer layers bonded with adhesive 3. Four sheets of encapsulated fuel 1 are then wrapped around the mandrel alternatingly with four sheets of encapsulated oxidizer 2, each sheet overlapping the next innermost sheet by one-eighth the circumference of the mandrel, and the starting point of each sheet being the center point of a mandrel cog. This design thus provides considerable intermingling of fuel and oxidizer portions in the grain and equal burning surface areas of fuel and oxidizer.

Figure 10:
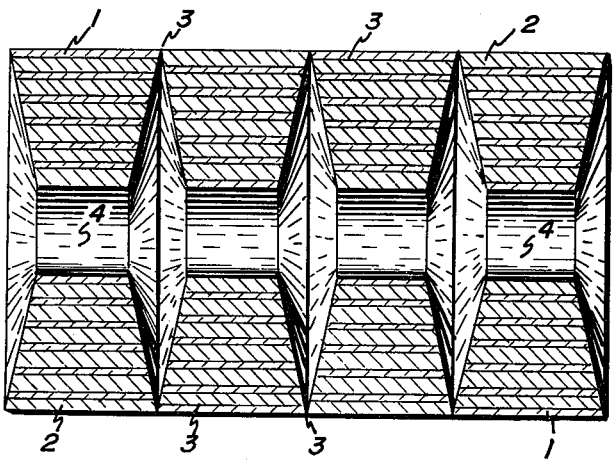
FIG. 10 is a longitudinal cross-section of the grain wherein the layers are convolute and the central aperture has a diameter which regularly increases and decreases along the length of the grain.

The grain depicted in longitudinal cross-section in FIG. 10 is also adapted to provide a controlled burning area. In this grain the central aperture 4 is circular in cross-section, the diameter of the circle increasing and decreasing periodically along the length of the grain. A practical method of building such a grain, for example, is to prepare a series of cylindrical grains having an equal number of alternating convolute layers of fuel 1 and oxidizer 2 bonded with adhesive 3, and a circular central aperture. Then the ends of the cylinders are uniformly taper-cut to give the desired increase in diameter in the central aperture 4 of the finished grain, the cuts not extending to the periphery of the cylinders. Then the tapered cylinders are bonded together with adhesive 3 at the edges near the periphery.

Figure 11:
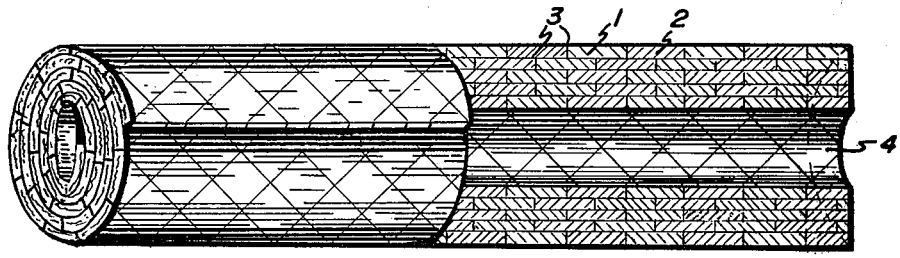
FIGS. 11 and 12 are perspective views in partial section of the novel grain wherein the layers are strips rolled in basket-weave and striping patterns, respectively.

The grain shown in partially sectioned perspective view in FIG. 11 provides a high degree of intermingling of fuel components and oxidizer components. This grain consists of interwoven strips of encapsulated fuel 1 and encapsulated oxidizer 2, rolled around a circular mandrel leaving, upon removal of the mandrel, a circular aperture 4. The strips are so interwoven that sections of fuel are adjacent to oxidizer sections and vice versa, and so rolled that fuel sections in a convolute layer are adjacent to oxidizer sections in an adjacent convolute layer. Confronting surfaces of the strips are bonded together with adhesive 3.

Figure 12:
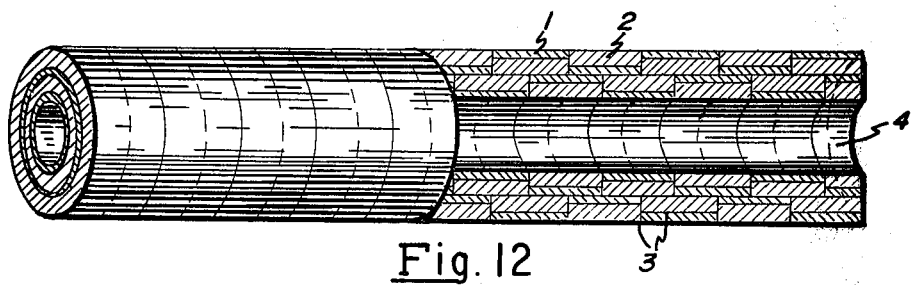

The grain shown in FIG. 12 is constructed from strips of encapsulated fuel 1 and encapsulated oxidizer 2 rolled to form a cylinder in such a way that oxidizer strips are adjacent to fuel strips, and vice versa. Confronting surfaces of the strips are bonded together with adhesive 3. The grain may be made by spiral-winding laminated fuel and oxidizer strips side-by-side or with partial overlapping so that oxidizer strips and fuel strips overlie fuel strips and oxidizer strips, respectively.

In all of the grains depicted in FIGS. 1 through 12, adhesive 3 may or may not be visible to the naked eye. When only a very small amount of polymeric adhesive is present between layers, the lines denoted by 3 may be detectable only with a magnifying lens.

In the solid propellant grain of this invention, the layers of encapsulated fuel and encapsulated oxidizer can be intermingled in a variety of ways, some of which are depicted in the accompanying drawings, described above. The particular manner in which the layers are arranged and the configuration of the grain and of a central aperture of the grain depend on such factors as the burning characteristics desired, ease of fabrication, equipment available, etc. Confronting surfaces of adjacent fuel and oxidizer layers in the grain are bonded together by a polymeric adhesive, which may or may not form a continuous layer therebetween. The polymeric adhesive forms part of the binding matrix of the layers and extends from within the layers to the surfaces thereof, thus forming a plurality of bonding sites on the surfaces of the layers. Therefore, the confronting surfaces of the layers in the grain may be bonded together by a joining of such sites on said surfaces. In the latter case, a continuous layer of adhesive may not be present between the confronting surfaces of the layers.

Sheet containing either a fuel or an oxidizing agent encapsulated in a polytetrafluoroethylene resin matrix may be prepared in the following manner. A fluid slurry of porous aggregates of colloidal polytetrafluoroethylene resin solids, the oxidizer or fuel, and optional ingredients, such as ballistic modifiers, in a wetting liquid is prepared and mixed; liquid is removed to form a solidified mass containing an amount of liquid such that, when the mass is confined, pressure is transmitted hydrostatically to the solids therein to such a degree as to effect coalescence of the aggregates of resin solids; and the liquid-containing solid mass is worked into a sheet by sequentially applying compressive shear stresses in which the shear stresses are alternately directed biaxially, and simultaneously expressing liquid from the mass, the amount of liquid retained in the mass during application of stresses being such that pressure is transmitted hydrostatically to effect coalescence of the aggregates of resin solids. Residual liquid may then be removed from the sheet, leaving pores therein. These pores are to be filled with a liquid or polymer which can be converted to a polymeric adhesive acting as a binding agent as well as a sealing material in the grain. If only a small amount of adhesive is desired, some of the pores may be removed by compaction prior to the filling with liquid monomer or polymer. In an alternative procedure, the polymeric adhesive may be incorporated into the sheet by using as the wetting liquid in the preparation of the slurry monomeric material which is polymerizable by mild heat or catalysis, or a cross-linkable polymeric material. In this case, residual liquid is not removed from the sheet after biaxial compression, nor is the sheet compacted.

In preparing the sheet, the solid ingredients, e.g., the oxidizer or fuel, preferably in finely divided form, and the polytetrafluoroethylene resin, in the form of discrete spheroidal aggregates, in the desired amounts are dispersed in a liquid which is capable of wetting the solid particles. The wetting liquid is one which forms a contact angle of less than 90° and preferably less than 45° with the solid particle surface. The wetting liquid performs two functions: (1) in the mixing step, it provides a fluid medium which permits the formation of a homogeneous mixture of the solid particles in an easy and safe manner; and (2) in the sheet-forming step it acts as a pressure-transmitting medium to effect distortion and slippage of the resin aggregates. The wetting liquid obviously should be one which does not dissolve the solid ingredients to any significant extent and preferably one which can be removed easily from the sheet, if necessary. Relatively volatile hydrocarbon liquids such as refined kerosene or naphtha are generally preferred wetting agents for use in the present process because they satisfy all of the above desired properties. However, less volatile liquids may be used and extracted with more volatile liquids. The fluorocarbons are excellent wetting liquids. Suitable fluorocarbons are, for example, perfluorodimethylcyclobutane, perfluorocarbon polyether oils, telomers of tetrafluoroethylene and cotelomers of this olefin with hexafluoropropylene or vinylidene fluoride, and ketone solutions of vinylidene fluoride-hexafluoropropylene copolymers. Preferably, the wetting liquid has a viscosity in the range of 0.4 to 1000 poises at room temperature although liquids of higher or lower viscosity can be used.

The amount of wetting liquid used to prepare the slurry is chosen primarily on the basis of the amount required to achieve ease and safety of mixing. With more unstable high-energy materials, a larger amount of liquid will be used to provide good dilution and desensitization. Since the fuel and oxidizer are never in the same mixture, the mutual sensitivity of these materials is no problem. The specific liquid-to-solids volume ratio used in the slurrying step to permit ease of mixing will depend on the size and porosity of the solid particles being incorporated in the liquid and the wetting power of the liquid toward the particles. In general a practical working ratio of liquid to solids by volume for incorporating finely divided, i.e., about 1–500 microns, propellant fuels, oxidizers, etc. and polytetrafluoroethylene resin powders comprising discrete porous aggregates averaging about 1 to 500 microns in diameter into the liquid is from about 5 to 20. The maximum operable ratio is determined solely on the basis of economic factors, size of equipment available, and handling considerations, since increasingly larger excesses of liquid have no deleterious effect.

To achieve uniform distribution of the solids throughout the liquid, the slurry is mixed vigorously, preferably by subjecting it to the cutting action of a high-speed bladed rotary stirrer. The temperature at which the mixing is effected a determined chiefly on the basis of the thermal stability of the ingredients and the volatility of the wetting liquid. Room temperature is suitable, although generally any temperature from about 0° to about 100° C. will be adequate. Mixing time is dependent on the speed of mixing used, the temperature, and degree of wettability of the solids by the liquid. In general, about one to about 15 minutes are sufficient to achieve adequate dispersion.

After the solids have been uniformly dispersed in the wetting liquid, the dispersion is subjected to a liquid-removing procedure, e.g., filtration or evaporation, whereby a solid mass is obtained which contains residual liquid in an amount such that, when the mass is confined, pressure is transmitted hydrostatically to the solids therein to effect deformation and slippage of the resin aggregates and thereby to coalesce the mass into a sheet-like structure. The liquid-containing solid mass thus is said to be in a "hydrostatically coalescible" condition and is maintained in such condition throughout the subsequent compressive deforming steps. The liquid-to-solids volume ratio in the mass is a critical factor in attaining this coalescible condition. If the liquid-to-solids volume ratio is inordinately large, the pressure applied to the mass may not be transmitted sufficiently to the solids and the desired deformation and orientation of aggregates may not be achieved. On the other hand, if too little liquid is used, a fragile structure may result. The liquid-to-solids volume ratio required to maintain a hydrostatic condition in the mass depends on the size, shape, density, and surface characteristics of the solid particles therein and therefore differs for different formulations. For a solid mass comprising polytetrafluoroethylene resin powder in a wetting liquid, wherein the porous resin aggregates average about 300 microns in diameter, usually about 0.5 to 2 volumes of liquid per displacement volume of resin are required prior to compression to achieve the hydrostatic condition. The presence of the oxidizer or fuel and possibly other propellant ingredients in the wet mass may increase the amount of liquid needed if they are porous, of relatively large size, do not wet easily, etc. Assuming, however, that the ingredients will have a small particle size, e.g., about $10\mu$, will be only moderately porous, and will be readily wet by the liquid, the foregoing liquid-to-solids volume ratio will be suitable in the mass prior to compression.

The hydrostatically coalescible solid mass obtained after removal of some of the liquid from the dispersion, is formed into a shett-like structure by the sequential application of compressive shear stresses in which the shear stresses are alternately directed biaxially, whereby liquid is simultaneously expressed from the mass but only to the degree that sufficient liquid is retained in the mass to keep the mass hydrostatically coalescible during the compression steps. The amount of liquid required to maintain the hydrostatic condition decreases as the mass is compressed, or as the aggregates become closer together. Therefore, the controlled expression of liquid from the mass during compression does not destroy the hydrostatic pressure coalescibility of the mass. In general, the liquid-to-solids volume ratio will not go below about 0.3 during the compressing steps.

The sequential application of compressive shear stresses to the solid mass is effected by rolling out the mass first in one direction and then in a direction which is approximately 90° to the direction of the first rolling and in the same horizontal plane. The alternating of rolling directions is continued until the desired sheet strength is achieved. Because the rolling causes an elongation of the mass in the direction of rolling and a reduction in thickness of the mass, it is preferable after the first rolling to fold the elongated, thinned mass back on itself in the direction of the longest dimension to obtain two congruent layers; and to roll the two-layered mass in a direction parallel to the fold. The steps of folding back and rolling the folded layered mass in a direction perpendicular to the last previous fold can be repreated until the desired number of layers are formed. The strength which is required in the sheet is a prime factor in determining the conditions employed in the rolling operation, i.e., the number of rolling steps, the rate at which pressure is applied to the mass (or the reduction in thickness of the mass effected by each rolling step) and at which liquid is expressed from the mass, the temperature, and the particular liquid-to-solids volume ratio maintained. In preparing the propellant grain of this invention, it is not always necessary that a sheet of optimum strength be formed, since strength is eventually imparted to the grain by the lamination of layers of sheet. Therefore, in this process the minimum strength of the sheet will be that which will permit it to hold together during the subsequent operations. To achieve this minimum strength it generally is necessary to perform the folding and rolling operations at least about four times at constant roll nip opening. A greater number of rolling and folding operations may be used, but there generally is no advantage to having more than about 25 such steps.

Generally, it is best to introduce the deformation in the resin aggregates gradually rather than abruptly and severely. Therefore, the pressure is applied to the mass in small increments in the several rolling steps, thereby reducing the thickness of the sheets in small increments and expressing the liquid from the mass at a low rate. If the mass is subjected to abrupt and severe pressure, flaws and fissures in the resulting sheet may be observed. These can be removed, if produced in the early stages of the process, by continued rolling, possibly with the addition of liquid to the mass. However, in the preferred procedure the thickness of the sheet is reduced gradually, e.g., by about 25 to about 75 per cent in each rolling step. Such a procedure results in gradual expression of liquid from the sheet.

The rolling operation preferably is carried out at room temperature or slightly elevated temperatures. Temperatures below 19° C. are avoided because of the diminished coalescibility of the mass at such temperatures. Since higher rolling temperatures result in higher sheet strengths and therefore fewer rolling operations required to achieve desired strength, it may be desirable to operate at elevated temperatures provided they are below the decomposition temperature of the ingredients of the mass being rolled. A preferred range is from about 25° to about 135° C.

After the sheet having the desired number of alternately biaxially oriented layers has been formed, the residual liquid is removed from the sheet if the liquid is not a precursor to a polymeric adhesive. The manner in which this liquid removal is accomplished depends on the properties of the wetting liquid. If the latter is relatively volatile, the sheet may be kept at a slightly elevated temperature for the time required for all of the liquid to volatilize.

Sheet from which the liquid has been removed is porous. If desired, the porosity of the sheet can be reduced to any chosen level by densifying the sheet, e.g., by compacting it compressively. Some porosity will be left in the sheet, however, since the pores are needed for introducing the liquid precursor to the polymeric adhesive. Preferably, the polymeric adhesive will be a high-energy material and in this case, the sheet will not be compacted since a large number of pores are desirable to incorporate a high percentage of such material. On the other hand, if a low-energy adhesive will be used, the porosity of the sheet will be reduced to provide a low percentage of low-energy adhesive. This may be accomplished, for example, by compression between rollers. The total pressure applied to the sheet in this operation is dependent on the amount of densification desired. The ultimate thickness of the sheets which are to be used to form the layers in the propellant grain can vary as desired. Generally, however, sheets thinner than 1 mil are not strong enough to withstand the subsequent operations. A preferred range of sheet thickness is 10 to 500 mils. Thicknesses above 500 mils are not preferred because of possible density gradients, difficulty in filling pores therein completely with liquid monomer or polymer, and difficulty in rolling them into convolute layers.

The sheet, preferably after cutting and/or sectioning into pieces which will be used in constructing the grain, is next treated with a liquid monomer or polymer which will be polymerized or crosslinked, respectively, during or after application to the sheet or section to form an adhesive within and around the layers. This operation is performed in cases in which a liquid monomer or polymer has not been previously incorporated into the sheet. It is desirable to fill the pores completely, preferably by immersing the sheet in the liquid monomer or polymer for a time sufficient for the liquid to flow into the pores. Obviously, the monomer or polymer should be one which can be applied as a fluid and which can solidify on the surface of and within the pores of the sheet to form a strong polymeric adhesive. Elastomeric adhesives are generally preferred to give the sheet resistance to fracture during grain fabrication and to provide such resistance in the fabricated grain. The monomer or polymer applied, as well as the polymer formed, must not be reactive with the ingredients of the fuel sheet or the oxidizer sheet at storage temperatures. To assure complete impregnation of the sheet, the impregnating liquid should be one which is not so viscous at the impregnation temperature as to prevent easy flow into the pores of the sheet. Liquids having viscosities not exceeding 100 poises at 25° C. are preferred.

After a polymerizable monomer or crosslinkable polymer has been introduced into the sheets or sections of sheet containing encapsulated fuel and those containing encapsulated oxidizer, the sheets or sections thereof are combined together in the desired manner to form a grain composed of laminated convolute layers and/or laminated planar layers. As depicted in the accompanying drawings, many variations are possible in the formation of such a structure. Cylinders may be formed by "carpet-rolling" sheets of the necessary dimensions to produce a grain of the desired size; or the grain may be constructed by bonding together two or more cylinders of "carpet-rolled" sheets. Convolute layers may also be formed by cutting the sheets into strips or tapes and the latter rolled around a mandrel in such patterns as basket-weave patterns, striping patterns, etc. In the forming of cylinders from stacked planar layers, the stacked layers may be of the dimensions necessary to produce a grain of the desired size, or stacked-layer sections may be bonded together to produce the grain.

The monomer or polymer within and around the sheets or sections thereof hardens, i.e., polymerizes of crosslinks, during and/or after grain fabrication. For example, in sheets which have been impregnated with a liquid monomer and polymerization catalyst and/or accelerator, polymerization may begin before grain construction is started thereby providing a certain degree of bonding between layers as the laminate is formed, and the polymerization reaction may be completed later, either by allowing the grain to stand or by heating it slightly. When a crosslinkable polymer is present, the grain may be fabricated first and then heat applied to harden the polymer. As a result of the polymerization or crosslinking, the layers in the grain are bonded together to give the grain good structural integrity, and the fuel particles and oxidizer particles in their respective layers are more completely encapsulated. Since the monomer or polymer has been converted to a polymeric adhesive within the internal structure of the layers, there is better bonding of the layers due to mechanical bonding effects as well as adhesive bonding. In such a structure, the propellant matrix or binder can be said to consist of polytetrafluoroethylene and the polymeric adhesive.

The monomer or polymer applied to the sheets can be any liquid material which is not reactive with the solid materials in the sheet which it contacts and which can be converted to a strong adhesive upon standing, possibly with the application of slight heat. A polymerization or crosslinking catalyst or accelerator may be added to the liquid. Examples of monomers which may be used are styrene, vinyl ethers, aldehydes, acrylic esters, allyl esters, diisocyanates, and diols. A mixture of monomers may be used. Crosslinkable polymers which may be used are, for example, phenolic amine resins, phenol/formaldehyde resins, prepolymers of acrylic esters with diacrylates, and epoxy resins, e.g., the reaction products of epichlorohydrin with diphenols. In one embodiment of this invention, pores in the sheets from which the novel grain is constructed will be filled with an adhesive which is an energy-providing composition and the bonds between layers in the grain will be comprised of the same composition. For example, porous sheets may be impregnated with a liquid monomeric or polymeric material containing high-energy groups, e.g., 2,3-bis-(difluoroamino)propyl acrylate, the thus-impregnated sheets or sections thereof combined to form the laminated grain, and the polymerization allowed to proceed.

The percentage of polymeric adhesive which will be present in the grain will be determined chiefly on the basis of the nature of the polymer and the other ingredients in the propellant grain. If the polymeric adhesive is one which contributes significantly to the energy content of the grain, it may be desirable to provide high porosity in the grain, e.g., up to about 40 per cent by volume, and to fill the pores with the high-energy polymer. On the other hand, if the energy of the propellant is derived almost exclusively from the solid materials incorporated in the sheet, the amount of adhesive present within the sheet will be minimal. When a relatively non-energetic adhesive is present, such material generally will be present in the minimum amount needed for good bonding of layers. If the polymeric adhesive is relatively non-energetic, the per cent by volume of this polymer in the grain preferably will be between 3 and 20%. On the other hand, if the polymer is energetic, it may occupy as much as about 40 per cent of the volume of the grain. As stated before, the polytetrafluoroethylene resin, a relatively nonenergetic ingredient, can be present in amounts as low as about 5 per cent by volume, based upon total grain volume.

A wide variety of particulate solid ingredients can be used in the novel grain of this invention, including various high-energy fuel-oxidizer combinations. The polytetrafluoroethylene resin used as a binder is inert to virtually all known propellant ingredients. Free alkali metals and certain alkali metal complexes, however, should not be contacted with the resin. The particulate solid ingredients in any layer should not be reactive with the polymeric adhesive in contact therewith. Oxidizers which may be employed are, for example, inorganic oxidizing salts, e.g., ammonium perchlorate or nitrate, nitronium perchlorate, hydrazinium perchlorate, hydrazinium nitroformate, organic nitrates, certain nitroureas such as bis-2,2,2-trinitroethyl urea, and nitramines such as bis-2,2,2-trinitroethylnitramine. Metallic fuels, such as aluminum, beryllium, boron, magnesium, beryllium hydride, aluminum hydride, and lithium aluminum hydride, may be used. Chemically incompatible fuel-oxidizer systems can be used since the fuel and oxidizer are separately encapsulated in the novel grain of this invention. As is shown in the following examples, some of these systems provide a specific impulse (equilibrium flow) close to 300 seconds. Ballistic modifiers, such as burning rate catalysts, can also be incorporated into the grain, either in the fuel sheet, oxidizer sheet, or both.

The following examples serve to illustrate specific embodiments of the present invention. However, they will be understood to be illustrative only and not as limiting the invention in any manner.

EXAMPLE 1

Preparation of sheet containing aluminum (Sheet A)

A mixture of 26 grams of polytetrafluoroethylene resin powder (comprising discrete spheroidal aggregates averaging about 300 microns in diameter), 174 grams of powdered aluminum (average particle size 6.3 microns), and 500 milliliters of kerosene was subjected at room temperature for one minute to the action of a bladed rotary stirrer, the blades operating at a speed of about 4000 revolutions per minute. The mixture then was filtered by suction, leaving a filter cake weighing 281 grams, i.e., containing 28.8% kerosene by weight. The filter cake was rolled out four times on a stainless steel plate with a wooden rolling pin. The cake was first rolled out to 50% its thickness. After the first roll, the mass was folded in half in the direction of the rolling, i.e., the longest dimension, and the folded mass rolled out to one-half its thickness in a direction parallel to the fold, i.e., 90° to the direction of the first rolling. The folding and rolling to 50% thickness parallel to the fold was repeated twice more.

The wet sheet, 200-mils thick, obtained by thus hand-rolling the filter cake was then rolled mechanically by passing the sheet nine times through a pair of rollers set 100 mils apart. The same procedure as used in the hand-rolling operation was followed, i.e., the sheet was rolled to one-half its thickness, folded in half in the direction of the rolling, the folded sheet turned 90° in the horizontal plane, and then the passing through the rollers, folding, and turning repeated until the sheet had been rolled nine times. After the last rolling, the sheet was 100 mils thick and weighed 238 grams, i.e., the sheet contained 16% kerosene by weight. The sheet then was kept in a vacuum oven for 20 hours at 50° C. under a pressure of 20 inches. After drying, the sheet weighed 200 grams, indicating complete removal of the kerosene.

As a result of the removal of kerosene from the sheet, the latter was rendered porous. In order to reduce the porosity of the sheet, the latter was densified by passing it six times through a pair of rollers in the same direction each time, the rollers being tightened with each pass. The first rolling reduced the thickness to 89 mils, the second to 77 mils, the third to 66 mils, the fourth to 55 mils, the fifth to 43 mils, and the last to 31 mils. The sheet then was trimmed to a 4-inch width, the trimmed sheet weighing 53.0 grams.

Preparation of sheet containing ammonium perchlorate (Sheet B)

A mixture of 26 grams of polytetrafluoroethylene resin powder (comprising discrete spheroidal aggregates averaging about 300 microns in diameter), 173 grams of ammonium perchlorate (average particle size 26 microns), and 500 milliliters of kerosene was subjected at room temperature for one minute to the action of a bladed rotary stirrer, the blades operating at a speed of about 4000 revolutions per minute. The mixture then was filtered by suction, leaving a filter cake weighing 258 grams, i.e., containing 22.1% kerosene by weight. The filter cake was rolled out in the same manner as that described in the preparation of Sheet A, except that the wet sheet, 400-mils thick, was rolled mechanically by passing seven times through a pair of rollers set 200 mils apart. After mechanical rolling, the sheet (Sheet B) was 200 mils thick and weighed 235 grams, i.e., it contained 15% kerosene by weight.

The sheet was densified as described in the preparation of Sheet A, the first rolling reducing the thickness to 177 mils, the second to 152 mils, the third to 130 mils, the fourth to 105 mils, the fifth to 80 mils, and the last to 62 mils. Sheet B was trimmed to a 4-inch width, the trimmed sheet weighing 81.6 grams.

Impregnation of Sheets A and B with liquid monomer

The sheets were trimmed to the same length and deoxygenated. A monomer mixture was prepared as follows: The monomer used was a mixture of 10 milliliters of ω-hydrododecafluoroheptyl acrylate and 30 milliliters of ω-hydrododecafluoroheptyl methacrylate containing 0.25 gram of benzoyl peroxide as a polymerization catalyst and 0.13 gram of N,N-dimethyl-p-toluidine as a polymerization accelerator. The catalyst was dissolved in the acrylate-methacrylate mixture, and then the accelerator was added. Immediately thereafter, Sheets A and B were placed in the monomer mixture and polymerization of the monomers allowed to take place, the temperature rising to about 40° C. When the mixture became viscous, the sheets were removed from the mixture and excess polymer adhering to the surfaces of the sheets was removed.

Preparation of the cylindrical grain

Sheet B was placed over Sheet A in such a manner that the longitudinal edges of the sheets coincided but the horizontal edges of one sheet were shifted from the horizontal edges of the other by 1.75 inches. The resulting two-layered unit then was wrapped around a rubber mandrel, 4-½ inches long and 1-⅜ inches in diameter. The grain and mandrel were inserted into a test motor casing 2 inches in diameter and 4 inches long. The interior of the casing had been coated with the same monomer mixture as had been used to impregnate the sheets, the monomers having been allowed to polymerize. The rubber mandrel was expanded by application of pressure to the ends thereof, thereby to cause radial pressure to be exerted from the interior of the grain to press the grain against the casing. The test motor then was kept overnight in an oven at 85° C. to assure complete polymerization of the monomers in the grain. The mandrel then was removed, leaving an axial perforation in the grain. The total weight of the grain and polymer was 161 grams. Thus, the grain was composed of 16.5% of the acrylate polymers, 43.5% of ammonium perchlorate, 28.6% of aluminum, and 10.9% of polytetrafluoroethylene (all by weight). The thus-loaded test motor, which was provided with an efflux nozzle of 0.362 inch diameter, was fired by means of an igniter located in the axial perforation. A pressure of 800 p.s.i. was reached in about 0.5 second. The calculated specific impulse (equilibrium flow) was 200 seconds.

Linear burning rate measurements were made on two samples of propellants prepared by laminating layers as described above. The samples were four-ply sheets of alternating layers of encapsulated aluminum and encapsulated ammonium perchlorate prepared and bonded together as described above. The samples burned satisfactorily as shown in the following table:

| Propellant No. | Composition (% by wt.) | | | | Burning Rate (in. per sec.) at 1000 p.s.i. | Pressure Exponent |
|---|---|---|---|---|---|---|
| | Al | NH$_4$ClO$_4$ | "Teflon"* | Adhesive | | |
| 1 | 48.8 | 21.9 | 10.6 | 18.7 | 0.76 | 0.55 |
| 2 | 20.4 | 45.3 | 9.8 | 24.5 | 0.81 | 0.60 |

*Polytetrafluoroethylene

The following example illustrates the outstanding stability properties of the solid propellant grain of this invention in which the fuel and oxidizer are separately encapsulated in contrast to conventional grains in which the fuel and oxidizer are in contact with each other. It further illustrates the comparative safety associated with preparing a grain having separately encapsulated fuel and oxidizer as contrasted to the hazards involved in preparing grains in which the fuel and oxidizer particles intermingle.

EXAMPLE 2

Propellant sheets containing tetrafluoroethylene, ammonium perchlorate, lithium aluminum hydride, and polymerized ω-hydrododecafluoroheptyl acrylate and ω-hydrododecafluoroheptyl methacrylate were prepared by two methods. In one case (Method A), the fuel was encapsulated separately from the oxidizer in separate sheets of polytetrafluoroethylene and the sheets were impregnated with the acrylate-methacrylate polymers and laminated together. In the other case (Method B), all of the ingredients were incorporated in one sheet and the sheet was impregnated with the polymer mix. The sheets handled in each step in each method were tested for sensitivity to impact, heat, and static discharge. The results are given in the following table.

Impact sensitivity was measured by dropping a weight through a distance onto the sample. The results are reported as the product of the distance in centimeters and the weight in kilograms which results in detonation in 50% of the trials. 480 kg.-cm. is the largest distance-weight product achievable on the apparatus used.

Thermal sensitivity was measured by (a) the hot bar test, in which the sample is placed on a metal bar which is at 250° C. and the effect on the sample is noted; and (b) the copper block test, in which the sample is placed in a well in a copper block and the latter is heated gradually (in increments of 5°–15° per minute) to 250° C., the effect on the sample being noted.

Static sensitivity is reported as the number of man-equivalent-volts required to fire the same (1-man-equivalent-volt = energy of a condenser of 0.003 microfarad capacitance charged to a potential of 1 volt).

Sensitivity of Materials Handled in Method A (Separate Encapsulation)

| Material Tested | Impact (kg.-cm.) | Thermal | | | | | | Static | |
|---|---|---|---|---|---|---|---|---|---|
| | | Hot Bar | | | Copper Block | | | | |
| | | min.[c] | °C | remarks | min.[c] | °C | remarks | M.E.V.[a] | Remarks |
| 1. LiAlH$_4$ | >480 | 0 | 250 | flashed | 4.5 | 150 | ignited | 58,600 | no reaction |
| 2. LiAlH$_4$, wet with kerosene | >480 | 0.3 | 250 | burned | 15 | 250 | fumed | 58,600 | " |
| 3. LiAlH$_4$ (87 parts) "Teflon"[b] (13 parts) kerosene-wet as a biaxially oriented sheet | >480 | 1 | 250 | burned | 9 | 200 | fumed | 58,600 | " |
| 4. Same as No. 3, above, without kerosene, after compaction | >480 | 0 | 250 | flashed | 15 | >250 | no reaction | 77,500 | no reaction |
| 5. NH$_4$ClO$_4$ | >480 | 5 | 250 | no reaction | 15 | >250 | no reaction | 77,500 | no reaction |
| 6. NH$_4$ClO$_4$, wet with kerosene | >480 | 5 | 250 | " | 15 | 250 | " | " | no reaction |
| 7. NH$_4$ClO$_4$ (87 parts) "Teflon" (13 parts) kerosene - wet | >480 | 5 | 250 | " | 15 | >250 | " | " | no reaction |
| 8. Same as No. 7 above, as a biaxially oriented sheet | >480 | 5 | 250 | " | 15 | >250 | " | " | no reaction |
| 9. Same as No. 8 above, without kerosene, after compaction | >480 | 5 | 250 | " | 15 | >250 | " | " | no reaction |
| 10. Sheets No. 4 & 9 above, each impregnated with 20 parts of polymer and laminated together | 240 | 5 | 250 | " | 15 | 250 | " | 58,600 | no reaction |
| 11. "Teflon" (13 parts) NH$_4$ClO$_4$, (56 parts) LiAlH$_4$ (31 parts) kerosene (excess) | >480 | 0.1 | 250 | flashed | 5 | 154 | ignited | 58,600 | no reaction |
| 12. Same as No. 11 above, excess kerosene filtered off | 282 | 0.1 | 250 | " | 4 | 153 | " | " | no reaction |
| 13. Same as No. 12 above, as biaxially oriented sheet, without kerosene | 14 | 0 | 250 | " | 4 | 142 | " | 28,300 | fired |
| 14. Same as No. 13 above, after compaction | 15.5 | 0 | 250 | " | 4 | 150 | " | 4,580 | fired |
| 15. Same as No. 14 above, impregnated with 20% polymer | 24 | 0 | 250 | " | 4 | 150 | " | 58,600 | no reaction |

[a] M.E.V. = man-equivalent-volts
[b] "Teflon" - polytetrafluoroethylene resin
[c] min. = minutes

EXAMPLE 3

Two- and four-ply laminates of alternating layers of fuel and oxidizer were made from sheets comprising 70.4% ammonium perchlorate encapsulated in 10.4% polytetrafluoroethylene and 19.2% of the polymerized monomer mixture described in Example 1, and sheets comprising 51.5% of lithium aluminum hydride encapsulated in 9.1% polytetrafluoroethylene and 39.4% of the same polymerized monomer mixture. In strand burning rate tests, the laminates burned at a rate of 0.61 inch per second at 1000 p.s.i. The pressure exponent was 0.75.

EXAMPLE 4

Presented in the following table are illustrative grain compositions and the specific impulses of each. In each case the grain consists of layers of fuel encapsulated in the matrix of polytetrafluoroethylene and the polymeric adhesive and layers of oxidizer encapsulated in a similar matrix, the grain being formed by alternating the layers as described herein, and the proportioning of fuel and oxidizer being provided by control of layer thickness and density. The percentages of each component are based on the total weight of the component in the finished grain.

| Grain No. | % "Teflon"[a] | Polymeric Adhesive | Oxidizer | Fuel | Theoretical Specific Impulse (equilibrium flow) |
|---|---|---|---|---|---|
| 1 | 10.5 | Polymer mix of Ex. 1 (19.5%) | $NH_4ClO_4$ (48.3%) | Al (21.7%) | 246 sec. |
| 2 | 11 | DPA[b] (17%) | $NH_4ClO_4$ (51%) | Al (21%) | 259 sec. |
| 3 | 11 | DPA (17%) | hydrazinium nitroformate (54.7%) | Al (17.3%) | 271 sec. |
| 4 | 11 | DPA (17%) | hydrazinium perchlorate (52.9%) | Al (19.1%) | 266 sec. |
| 5 | 8 | DPA (17%) | $NH_4ClO_4$ (46.74%) | $LiAlH_4$ (28.26%) | 281 sec. |
| 6 | 11 | DPA (17%) | nitronium perchlorate (41.9%) | $LiAlH_4$ (30.1%) | 290 sec. |
| 7 | 5 | DPA (17%) | nitronium perchlorate (43.3%) | $LiAlH_4$ (34.7%) | 294 sec. |
| 8 | 11 | DPA (17%) | BTNEN[c] (51.8%) | $LiAlH_4$ (20.2%) | 278 sec. |
| 9 | 11 | DEVE[d] (17%) | nitronium perchlorate (41.6%) | $LiAlH_4$ (30%) | 293 sec. |
| 10 | 11 | polymer mix of Ex. 1 (17%) | $NH_4ClO_4$ (46.7%) | $LiAlH_4$ (25.3%) | 266 sec. |
| 11 | 11 | DPA (17%) | $NH_4ClO_4$ (49.2%) | $AlH_3$ (22.8%) | 276 sec. |
| 12 | 11 | DPA (17%) | nitronium perchlorate (45.3%) | $AlH_3$ (26.7%) | 287 sec. |

[a] "Teflon" - polytetrafluoroethylene resin
[b] DPA = 2,3-bis(difluoroaminopropyl) acrylate
[c] BTNEN = bis-2,2,2-trinitroethyl-nitramine
[d] DEVE = 1,2-bis(difluoramino)ethyl vinyl ether The invention has been described in detail in the foregoing. However, it will be apparent to those skilled in the art that many modifications are possible without departure from the scope of the invention.

We claim:

1. A solid propellant grain comprising a plurality of layers of encapsulated particulate solid fuel and layers of encapsulated particulate solid oxidizer, said fuel and oxidizer being encapsulated within their respective layers by a matrix comprising polytetrafluoroethylene and a polymeric adhesive, adjacent layers in said grain being bonded together at their confronting surfaces by a polymeric adhesive, and the layers in said grain being so disposed that a layer of oxidizer alternates with a layer or fuel.

2. A solid propellant grain according to claim 1, wherein said polymeric adhesive is a high-energy elastomeric material.

3. A solid propellant grain in essentially tubular form comprising a plurality of layers of encapsulated particulate solid fuel and layers of encapsulated particulate solid oxidizer, said fuel and oxidizer being encapsulated within their respective layers by a matrix comprising polytetrafluoroethylene and a polymeric adhesive, adjacent layers in said grain being bonded together at their confronting surfaces by a polymeric adhesive, and the layers in said grain being so disposed that a layer of oxidizer alternates with a layer of fuel.

4. A solid propellant grain according to claim 3, wherein said layers of encapsulated particulate solid fuel and layers of encapsulated particulate solid oxidizer are in convolute form, said convolute layers being disposed one upon the other in a direction essentially perpendicular to the longitudinal axis of said grain.

5. A solid propellant grain according to claim 3, wherein said layers of encapsulated particulate solid fuel and layers of encapsulated particulate solid oxidizer are essentially planar and are disposed one upon the other in a direction essentially parallel to the longitudinal axis of said grain.

6. A solid propellant grain according to claim 3, wherein the longitudinal aperture in said tubular-form grain is of such configuration that, when said grain is ignited along the surfaces thereof facing said aperture, the burning area of said gran remains essentially constant during burning.

* * * * *